US00RE34749E

United States Patent [19]

Leong et al.

[11] E Patent Number: Re. 34,749

[45] Reissued Date of Patent: Oct. 4, 1994

[54] APPARATUS FOR DETERMINING THE DISTANCES OF POINTS ON A SURFACE FROM A REFERENCE AXIS

[75] Inventors: Kenneth Leong, Burnaby; Donald Stewart, Langley, both of Canada

[73] Assignee: Softac Systems Ltd., Port Coquitlam, Canada

[21] Appl. No.: 905,603

[22] Filed: Jun. 26, 1992

Related U.S. Patent Documents

Reissue of:

[64] Patent No.: 4,937,445
Issued: Jun. 26, 1990
Appl. No.: 100,332
Filed: Sep. 23, 1987

[51] Int. Cl.[5] ..... G01B 11/02

[52] U.S. Cl. ..... 250/237 G; 250/560; 356/376; 356/381; 356/384

[58] Field of Search ..... 250/560, 561, 578.1, 250/208.2, 237 G; 356/373-379, 381-385; 358/107

[56] References Cited

U.S. PATENT DOCUMENTS

| | | | |
|---|---|---|---|
| 3,671,726 | 6/1972 | Kerr | 235/151.3 |
| 3,941,485 | 3/1976 | Madden | 356/385 |
| 4,259,018 | 3/1981 | Poirier | 356/375 |
| 4,294,544 | 10/1981 | Altschuler et al. | 356/376 |
| 4,427,880 | 1/1984 | Kanade et al. | 356/376 |
| 4,498,778 | 2/1985 | White | 356/376 |
| 4,629,324 | 12/1986 | Stern | 356/376 |
| 4,653,316 | 3/1987 | Fukuhara | 356/376 |
| 4,687,326 | 8/1987 | Corby | 356/375 |
| 4,867,570 | 9/1989 | Sorimachi et al. | 356/376 |

*Primary Examiner*—David C. Nelms
*Attorney, Agent, or Firm*—Joseph W. Berenato, III

[57] ABSTRACT

An apparatus for monitoring and determining the distances of points on a surface from a reference axis includes a light source, such as a laser, for projecting a main beam of light of relatively small diameter along an axis. A device, such as a diffraction grating, is provided for splitting the main beam of light into a plurality of discrete fractional beams of light. A further component, such as a diverging lens, angularly displaces the fractional beams relative to each other so the beams extend along a common plane towards a position for an object. Light reflected from the surface is projected onto a linear photodetector, the positions where the reflected fractional beams strike the linear photodetector being related to the distance from a reference axis to the points on the object where the fractional beams are reflected. Preferably there is a light gathering device such as a converging lens system for gathering the fractional light beams reflected off the object and for projecting real images thereof onto the photodetector.

21 Claims, 5 Drawing Sheets

APPARATUS FOR DETERMINING THE DISTANCES OF POINTS ON A SURFACE FROM A REFERENCE AXIS

Matter enclosed in heavy brackets [ ] appears in the original patent but forms no part of this reissue specification; matter printed in italics indicates the additions made by reissue.

FIELD OF THE INVENTION

This invention relates to an optical device for determining the distances between a reference axis and a plurality of spaced-apart points along an object.

BACKGROUND OF THE INVENTION

In the past many optical devices have been developed for determining the distances between a reference axis and points on an object and thereby deriving data on, for example, the thickness or shape of the object. One such device is found in U.S. Pat. No. 4,221,973 to Nosler which discloses a device employing optics for determining the position of a log in a plywood mill. Light from a laser is reflected off of the object and focussed onto a photodetector array by a lens. The distance from a reference axis to the point where the light is reflected on the log and thereby the diameter of the log, can be determined from the position where the light strikes the photodetector array.

Apparatuses are also known for monitoring and determining the instantaneous thickness of a moving strip of planar material simultaneously at several different positions. Such a device is disclosed in the U.S. Pat. No. No. 3,671,726 to Kerr. Here, light from a single source passes through a plurality of prisms, each of which reflects part of the light at right angles from the original beam towards the strip of material. The light from each prism strikes the object and is reflected towards a detector unit. Thus a plurality of detector units are required, one for each prism. Other such units employing a multitude of detector units have used an arc lamp and a plurality of optical fibers extending from the lamp towards the object.

An object of the present invention is to provide an apparatus capable of instantaneously determining the distances of a plurality of points on a moving strip from a reference axis while employing a minimum number of components for increased economy and reliability as well as ease of installation. It is a further object to provide a device capable of measuring closely spaced-apart points to provide more precise data on the object.

SUMMARY OF THE INVENTION

According to the invention, an optical apparatus has light projecting means, such as a laser, for projecting a main beam of light of relatively small diameter along an axis. There is beam splitting means such as a diffraction grating, positioned along the axis for splitting the beam into a plurality of discrete fractional beams of light. A diverging lens angularly displaces the fractional beams relative to each other so the fractional beams extend along a common plane towards a position for an object.

A photodetector array is positioned to receive the fractional beams after the fractional beams are reflected off the object.

Preferably there is light gathering means such as a converging lens for gathering the fractional light beams reflected off the object and for projecting real images thereof onto the photodetector array.

The photodetector array may be a linear charge coupled image sensor. In one preferred form of the invention, the image sensor is divided into a plurality of adjacent zones. The light gathering means projects the real image of each fractional beam onto one of the zones. The apparatus includes means for scanning each of the zones sequentially to determine the position of each of the real images within each of the zones.

DESCRIPTION OF THE PREFERRED EMBODIMENTS

Figure 1:
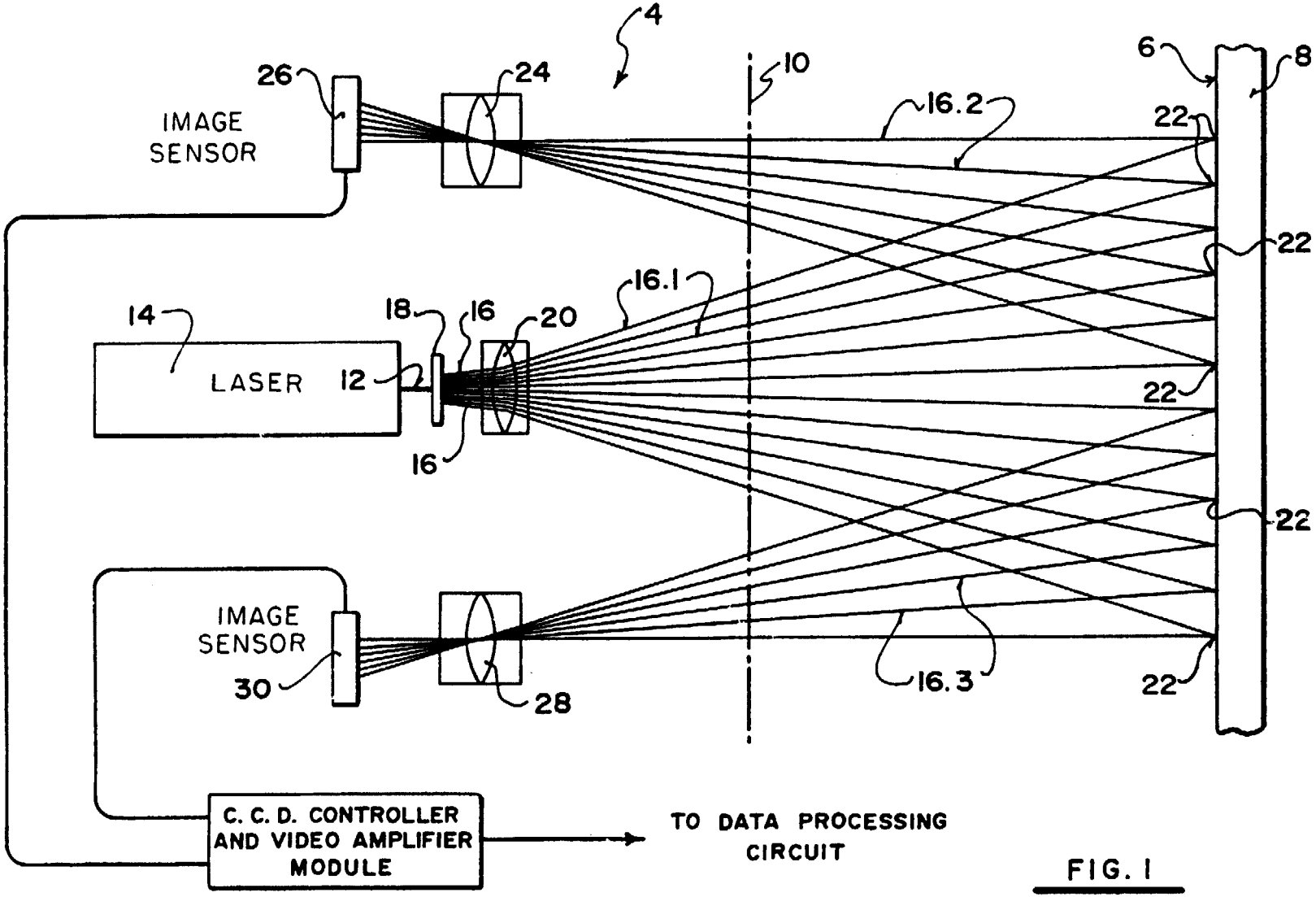
FIG. 1 is a simplified, partly diagrammatic side view of an optical apparatus according to an embodiment of the invention.

FIG. 1 shows an optical apparatus 4 for monitoring and determining the distances of a plurality of points on a surface 6 of an object 8 from a reference axis 10. In practical terms the device may be used, for example, for determining the surface profile and thickness of slabs sawn from a log in a sawmill. Data relating to the surface and thickness of the slab are used to determine the proper cutting pattern to yield the highest possible proportion of high grade lumber therefrom. When used for such a purpose, the object 8 representing the slab would normally be horizontal with the optical components located above the slab. The slab is moved widthwise, that is at right angles to the plane of the drawing, and a plurality of points 22 along the length of the slab are simultaneously monitored. The process is repeated periodically as the object moves to provide a profile of the entire surface of the object. It may readily be seen however that this is only one specific use for the apparatus which may be adapted for other similar functions.

The apparatus firstly includes means for projecting a relatively small diameter main beam of light 12, in this case an optical laser 14. The main beam of light is then split into a plurality of fractional beams of light 16 all extending along a common plane represented by the plane of the drawing. This is accomplished by a multiple imaging device in the preferred embodiment in the form of a diffraction grating 18. A diffraction grating is a known device in the art. Other means could be employed for dividing the main beam of light, for example a fiber graticule or a group of optical fibers with adjacent ends or a plurality of prisms could be employed. In the case of the optical fibers, the beam would be directed into the adjacent ends of the fibers, while the fibers would be arranged to diverge at the opposite end to split the beam.

After the main beam 12 is divided into a plurality of fractional beams 16, the fractional beams pass through a diverging lens 20, serving as means for angularly displacing the fractional beams relative to each other and for focusing them on object 8. The fractional beams 16.1 so displaced extend along the common plane of the drawing towards object 8. The angularly displaced fractional beams 16.1 strike surface 6 of object 8 at a plurality of points 22. Apparatus 4 serves to determine the distance of each of the points 22 from reference axis 10. The angularly displaced beams 16.2 on one side of lens 20 are reflected off of the object towards imaging lens 24 which projects real images of the spots of light at points 22 on object 8 onto a linear photodetector which, in this case, is a linear charge coupled image sensor 26. Similarly, the fractional beams 16.3 reflected on the opposite side of object 8 from lens 24 are reflected towards imaging lens 28 which projects real images of each of the spots of light on object 8 onto linear charge coupled image sensor 30.

Figure 2:
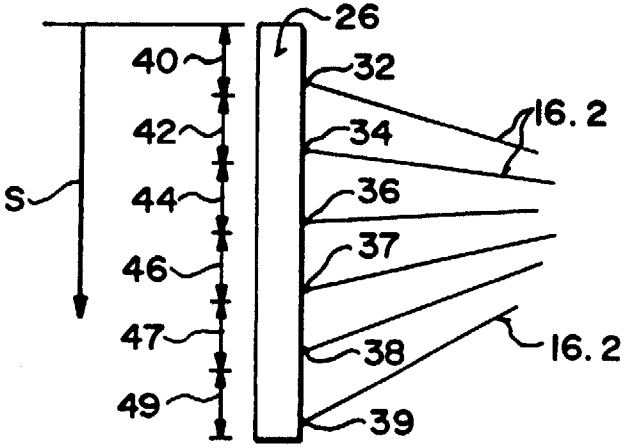
FIG. 2 is an enlarged simplified side view of one of the photodetector arrays of the apparatus of FIG. 1.

Referring to FIG. 2, this shows an enlarged view of image sensor 26 in simplified form. The fractional beams 16.2 form real images 32, 34, 36, 37, 38 and 39 on the image sensor. The geometry of the apparatus and the depth of field are such that the six images 32–39 are always within their respective zones 40, 42, 44, 46, 47 and 49. The distances between axis 10 and each of the points 22 is determined from the displacement of the images 32–39 in one direction for example direction S, in their respective zones. Simple geometry converts the displacements of the images to the distances required. The positions of the images 32-39 along the image sensor 26 are determined by scanning the image sensor and noting the cell location where one of the images is detected. At the end of each zone the process begins again for the next zone. In this embodiment a single spot of light occurs in each zone. This permits identification of each spot in case one spot is not reflected back to the image sensor due to a discontinuity out of range. As an alternative the entire sensor may comprise one zone which is canned to determine the positions of a plurality of images along the sensor. The positions of the images can then be related to the distances between axis 10 and points 22. This embodiment is useful for applications where, for example, discontinuities do not occur and all spots are always reflected back to the image sensor.

Imaging lens 28 and image sensor 30 operate in a similar manner for the fractional beams 16.3 reflected on the opposite side of lens 20.

CIRCUITRY AND DATA PROCESSING

Figure 3:
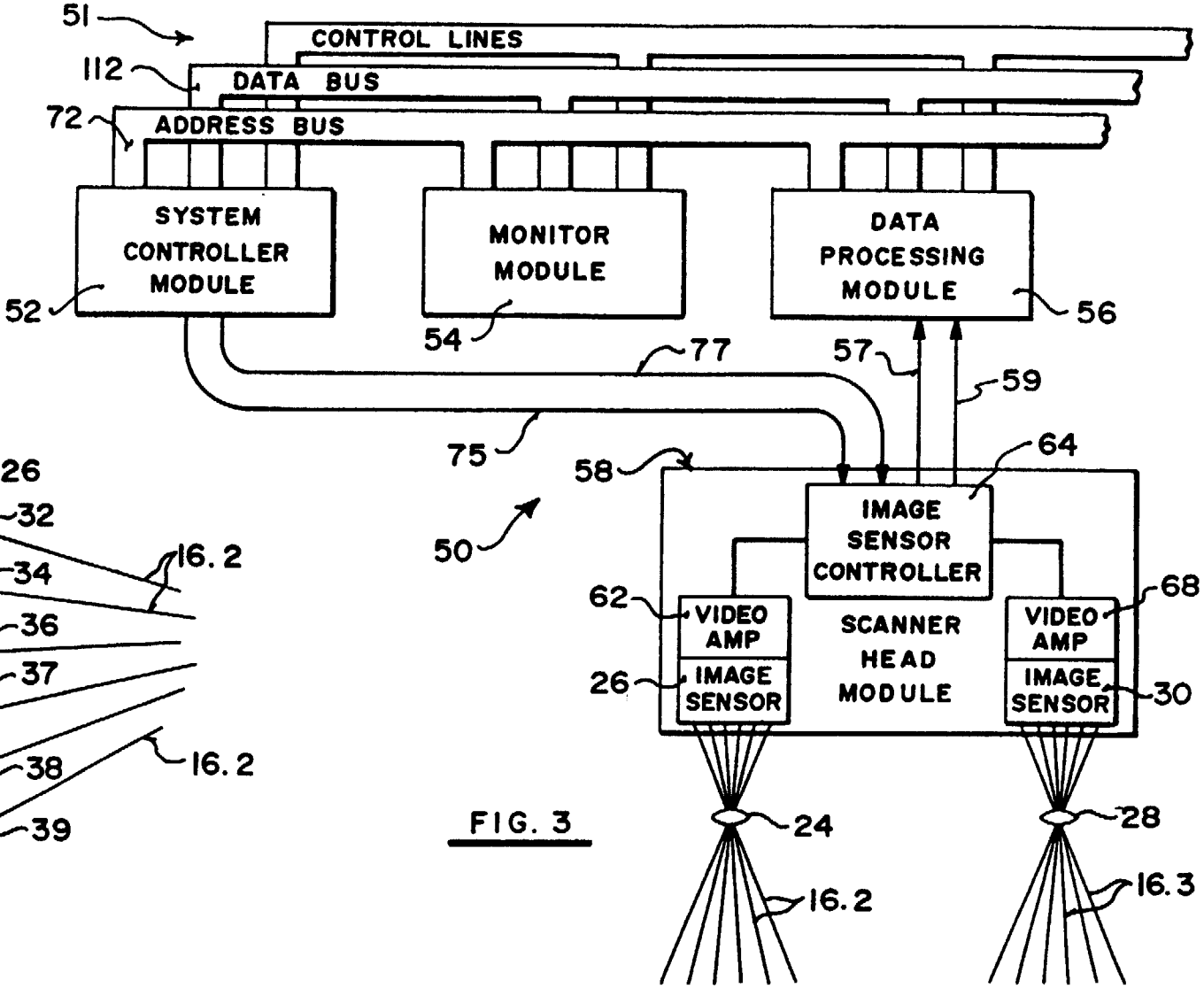
FIG. 3 is a block diagram of the circuitry employed for analyzing data for said device.

The data processing system for apparatus 4 is shown generally at 50 in FIG. 3. The system contains four modules comprising a system controller module 52, a monitor module 54, a data processing module 56 and a scanner head module 58. Variations of the system may involve a plurality of data processing modules 56 and a plurality of scanner head modules 58. All modules except the scanner head module 58, are operably connected to communicate via a bus system 51.

The purpose of the processing electronics is to receive reflected light images at the scanner head module 58, convert those light images into electrical signals, process the electrical signals and cause distance data to appear on a display. The processing electronics is also adapted to allow an external computer to read the data.

Control of the overall system is performed by the system controller module 52. The system controller module 52 manipulates control signals to the data processing module 56 and the scanner head module 58. The scanner head module 58 interprets these control signals and issues image signals 57, 59 to the data processing module 56. The data processing module 56 then interprets the image signals 57, 59 and stores the appropriate data in a memory device 102 such as a static RAM, shown in FIG. 5. This sequence of the issuance of control signals from the system controller module 52 of FIG. 3 to the scanner head module 58 and from the scanner head module 58 back to the data processing module 56 operates continuously many times per second. Should the user decide to observe the data being stored in the memory device 102 of FIG. 5, the monitor module 54 will send signals to the data processing module 56 which issues data signals back to the monitor module 54 which then displays the data for the user. The sequence of events involved in gathering and displaying data from the scanner head module 58 is described in greater detail below.

The scanner head module 58 of this embodiment is shown in FIG. 3. It includes two image sensors 26 and 30, two video amplifiers 62 and 68, and an image sensor controller 64. In this embodiment image sensors 26 and 30 are linear charge coupled device (CCD) light-sensors (such as NEC uPD799). These devices contain 2048 individual sensor cells. Under control of an image sensor controller 64, a particular image sensor 26, for example, is scanned by sequentially causing each of its cells to produce an output voltage corresponding to the received incident light. This is typically a very low level signal and is therefore subsequently amplified by the video amplifier circuit 62.

The video amplifiers 62, 68 in this embodiment are two stage wide band operational amplifier circuits. These circuits amplify the video signals from the image sensors 26, 30 to workable voltage levels.

Because the main light beam 12 is split into a plurality of fractional beams 16 as shown in FIG. 1, the signals generated by the fractional beams striking the image sensors 26, 30 are relatively weak and must be amplified by the video amplifiers 62, 68 to increase the signal to background noise ratio. This is accomplished by detecting the presence of an image sensor signal above a certain threshold and amplifying all signals above that threshold. The amplified signal appears as a saturated video output signal which is either high or low corresponding to the presence or absence of light on the particular cell being observed. The video output signal is buffered before being transmitted to the data processing module 56. Each video amplifier 62 and 68 in the scanner head module 58 transmits a separate signal 57, 59 to the data processing module 56.

The image sensor controller 64 in the scanner head module 58 is controlled by a clock signal 75 and a sync signal 77 originating at the system controller module 52. The clock signal 75 operates continuously. The sync signal 77 occurs at the beginning of the scan sequence.

When the system controller module 52 issues a sync signal 77, the image sensor controller 64 in conjunction with the clock signal 75 causes the image sensors 26, 30 to be scanned. The output of each cell of each image sensor 26, 30 is sent to its respective video amplifier 62, 68 on every second clock pulse of clock signal 75. The video amplifiers 62, 68 amplify the incoming signal and transmit the resulting amplified signals to the data processing module 56.

Figure 4:
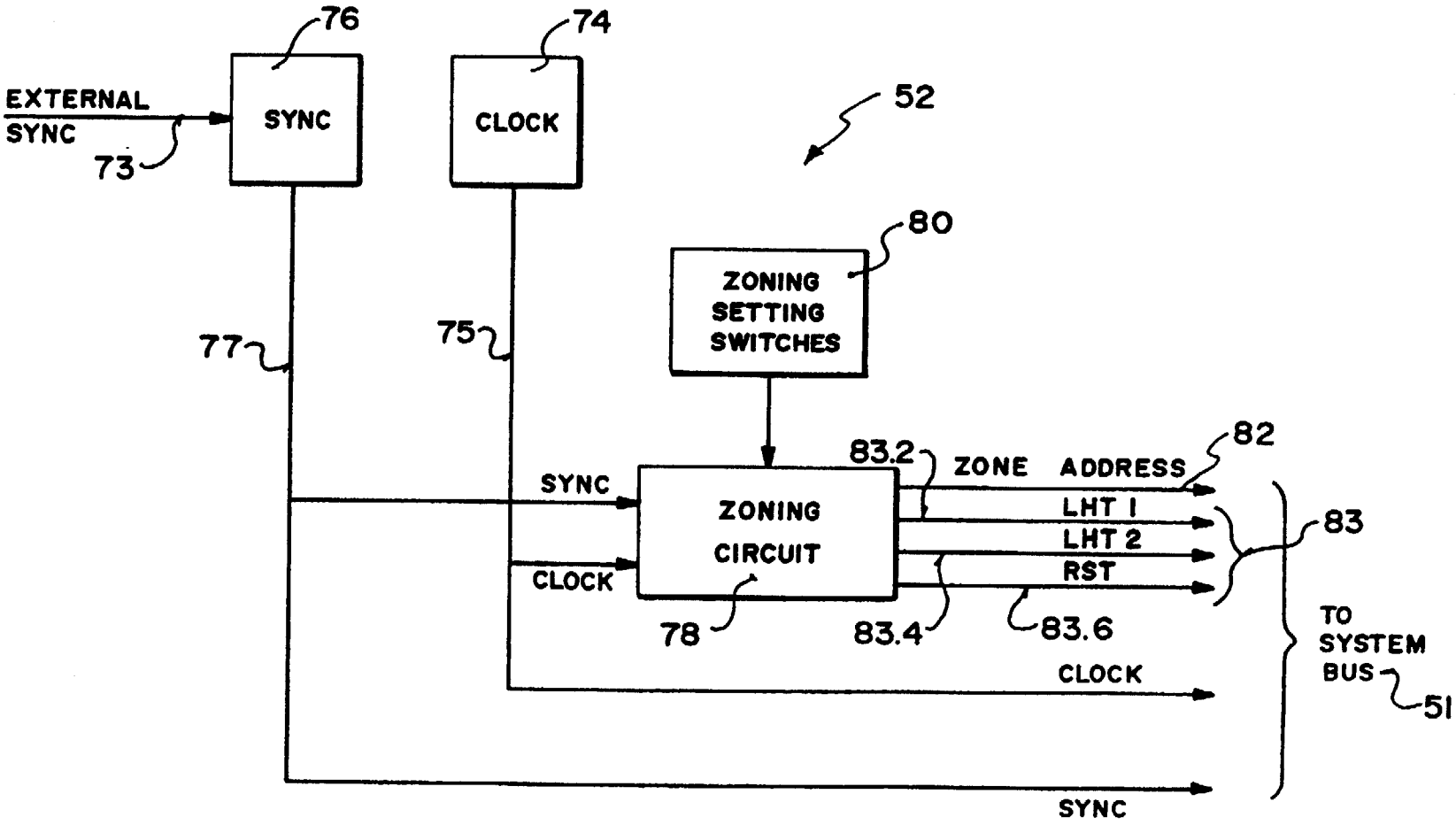
FIG. 4 is a block diagram of the circuitry employed in the System Controller module.

The system controller module is shown generally at 52 in FIG. 4. It includes a clock circuit 74, a sync circuit 76, a zoning circuit 78 and zoning setting switches 80. The system controller module 52 serves to provide clock 75 and sync 77 signals to all other modules in the system 50 shown in FIG. 3 and also to produce address and control signals for the storage of distance data.

The clock circuitry 74 generates a clock signal 75 of approximately 1 megahertz. This clock signal 75 is used in all other modules of the system. The sync circuitry 76 produces a sync signal 77 which is also used in all other modules. The sync circuitry 76 has the capability of accepting an external sync signal 73 from an external source and using that as the synchronization signal 77.

The zoning circuit 78 accepts clock 75 and sync signals 77 to produce a zone address 82 and zone control signals 83. The zone control signals 83 include a first latch signal (LTHI) 83.2, a second latch signal (LTH2) 83.4 and a reset signal (RST) 83.6.

The purpose of the zoning circuit 78 is to create the effect of dividing the image sensors into a plurality of zones. With a knowledge of the number of cells contained in each image sensor 26, 30, the user can set the zoning setting switches 80 corresponding to the number to zones he wishes the sensor field to be divided into.

In this embodiment, the user would set the zoning setting Switches 80 to correspond to six zones. With a sensor field of 2048 cells, this would result in six zones comprising 340 cells each with 8 cells unused. Thus, upon receiving a sync pulse, the zoning circuit 78 would form a zone address 82 and proceed to count 680 clock pulses ($2\times340$)from clock signal 75. At the end of the 680 clock pulses, the zoning circuit 78 would cause the appropriate zone control signals 83 to be activated, thereby controlling functions in the data processing module 56.

After the control signals 83 have been activated, the scanning and storage sequence for the first zone is completed. The zoning circuit 78 would then increment the zone address 82, count another 680 clock pulses and then activate the appropriate zone control signals 83 again. This would constitute the scanning and storage sequence for the second zone. This process would continue until all six zones have been scanned and their data stored. After all six are completed the scanning and storage process is repeated.

Figure 5:
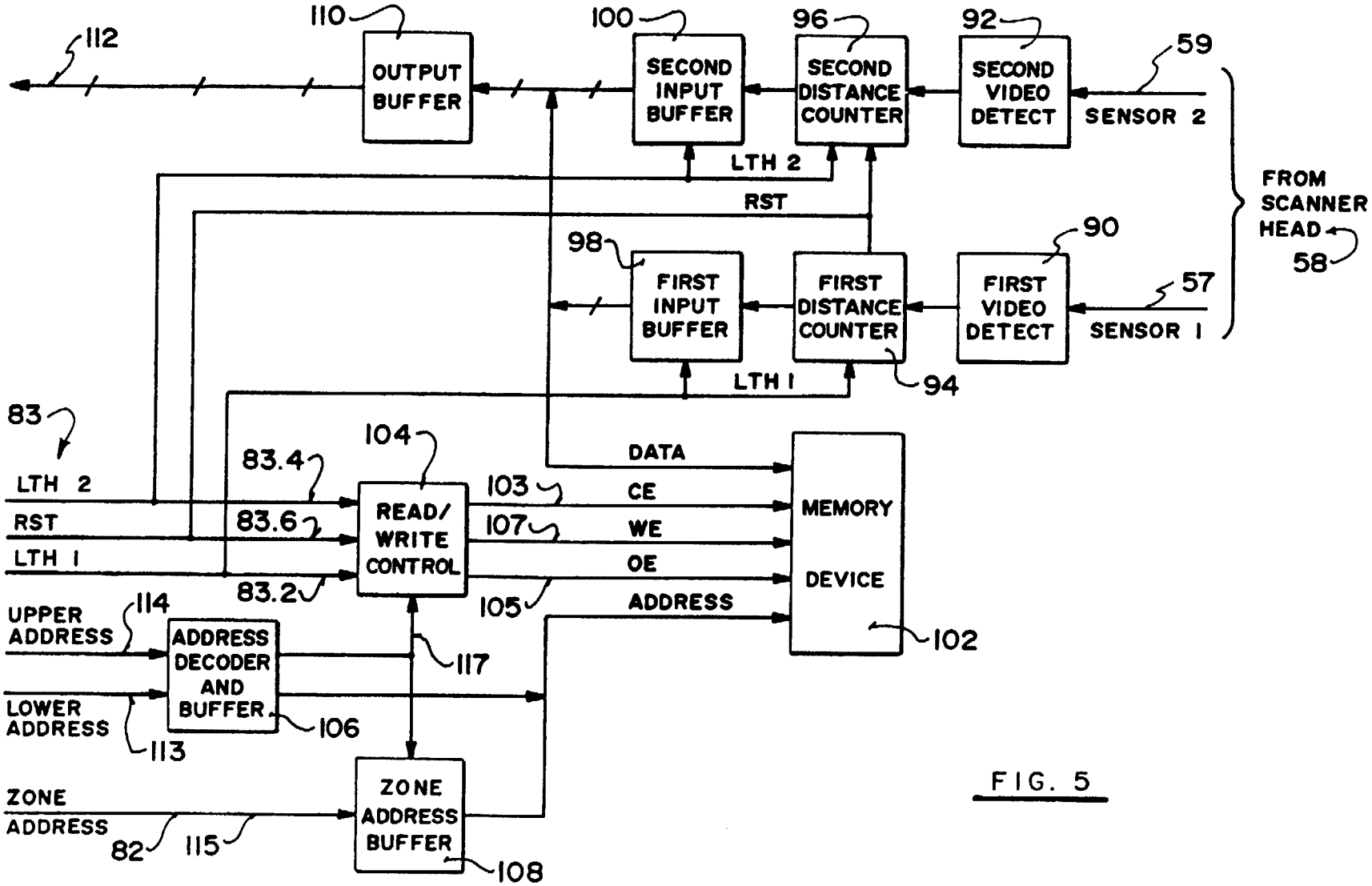
FIG. 5 is a block diagram of the circuitry employed in the data processing module.

The system controller module 52 components communicate with other modules of the system by the bus system 51 shown in FIG. 3. The bus system includes an address bus 72, a data bus 112, and control lines. Referring to FIG. 5, the address bus includes an upper address bus 114, a lower address bus 113, and the zone address bus 82. The data bus 112 has sixteen lines and supports read only operations. The control lines carry the zone control signals 83, the clock signal 75, the sync signal 77 and various other control signals such as power and ground as is known in the art.

The data processing module 56 shown in FIG. 5 accepts the zone address 82 from the system controller module 52 off the bus system 51. The zone address 82 is received at the data processing module 56 through a zone address buffer 108. The zone address buffer 108 presents the zone address 82 to the memory device 102. The memory device 102 is used to store data relating to the scanning of the image sensors 26, 30.

Data from the image sensors 26, 30 are transmitted to the data processing module 56 by the scanner head module 58 shown in FIG. 3. These data may be thought of as binary data where a "1" represents the occurrence of the incident light beam on the particular addressed cell and where a "0" represents no light incident on the particular addressed cell.

The binary data from the first image sensor 26 is applied to a first video detect circuit 90, shown in FIG. 5, on the data processing module 56. The binary data from the second image sensor 30 is applied to a second video detect circuit 92, also on the data processing module 56.

The first video detect circuit 90 monitors the incoming binary data for the occurrence of three successive "1's", the occurrence of three successive "1's" representing detection of a valid beam of light incident on the image sensor 26. Until the first "1" is detected, the first video detect circuit 90 supplies a count pulse on every clock pulse from clock signal 75 to a first distance counter 94. Upon detection of the first "1", the video detect circuit supplies count pulses to the first distance counter 94 at one-half the clock pulse rate of clock signal 75. After the last "1" of the three successive "1's" is detected, the first video detect circuit ceases its output of count pulses thereby stopping the first distance counter 94.

The first distance counter 94 consists of a twelve bit binary counter. At the beginning of a zone scan, the first distance counter 94 is reset to zero by the reset line 83.6 of the zone control signals. As the zone scan proceeds, the first video detect circuit 90 supplies count pulses to the first distance counter 94. With each count pulse the first distance counter 94 increments by one. When the count pulses from the first video detect circuit 90 cease, upon the occurrence of a valid light beam, the first distance counter 90 will hold its last count value. This count value will represent the position of the center of the incident light beam within the scanned zone of the image sensor 26 (i.e. the second of the three successive "1's"). The count value then is forwarded to a first input buffer 98.

The input buffer 98 passes the count value from the first distance counter 94 to the data storage memory 102. The output of the first input buffer 98 is controlled by the first latch signal 83.2 originating in the system controller module 52.

In a similar fashion, input data from the second image sensor 30 is applied to the second video detect circuit 92. This second video detect circuit 92 controls a second distance counter 96 which supplies its output to a second input buffer 100. The second distance counter 96 is controlled in a similar fashion to the first distance counter 94 and the second input buffer 100 is controlled in a similar fashion to the first input buffer 98. The output of the second input buffer 100 is controlled by the second latch signal 83.4 from the system controller module 52.

At the beginning of a zone scan, the distance counters 94, 96 will both the reset to "0". As scan data from each of the two image sensors 26, 30 appears at their respective video detect circuits 90, 92, the distance counters 94, 96 will begin counting. Each of the two distance counters 94, 96 will stop at a different count value depending upon where each respective light beam strikes each sensor zone as described above. At the end of the zone scan, the first input buffer 98 will be enabled to allow distance data from the first image sensor 26 to be stored in the memory device 102. Immediately following, the first input buffer 98 will be disabled and the second input buffer 100 will be enabled thereby storing the data from the second image sensor 30 in the memory device 102.

To facilitate the writing of distance counter 94, 96 data into the memory device 102, a memory write enable signal (WE) 107 is held active. The first and second latch signals 83.2, 83.4 are used by a read/write control circuit 104 to derive a chip enable (CE) 103 for the memory device 102 thereby initiating a memory write cycle.

The memory device 102 in this embodiment is organized as sixteen, sixteen bit words. The first eight locations a are for storing data from the first image sensor 26 and the next eight locations are for storing data from the second image sensor 30. In this embodiment, only six of the eight locations for each image sensor 26, 30 are used since each image sensor 26, 30 has been divided into six zones. Thus each zone within a particular image sensor 26, 30 is assigned a particular memory location into which a 16 bit word is stored. Each 16 bit word comprises one bit representing the first or second image sensor 26, 30, three bits representing the particular zone within the image sensor and 12 bits representing distance data.

Since the scanning process occurs continuously the sixteen memory locations are constantly updated. Scanning is only interrupted by a memory read operation.

To facilitate a memory read operation, the data processing module 56 of FIG. 5 contains an address decoder and buffer 106. This circuit has means to select a module identification (I.D.) number.

Through comparator means residing in the address decoder and buffer circuitry 106, the module I.D. number is compared with the upper address bus 114 to produce a module enable signal 117. This module enable signal 117 disables a zone address buffer 108 and enables signals from the lower address bus 113 to reach the memory device 102. By disabling the zone address buffer 108, no contention of lower memory address lines occurs. The module enable signal 117 also acts as an input to the read-write control circuit 104 which produces the chip enable 103 and an output enable (OE) 105 signal for the memory device 102.

Upon receiving chip enable 103 and output enable 105 signals, the memory device 102 passes its contents through an output buffer 110 to the system data bus 112. The output buffer 110 is enabled by the output enable signal 105.

Figure 6:
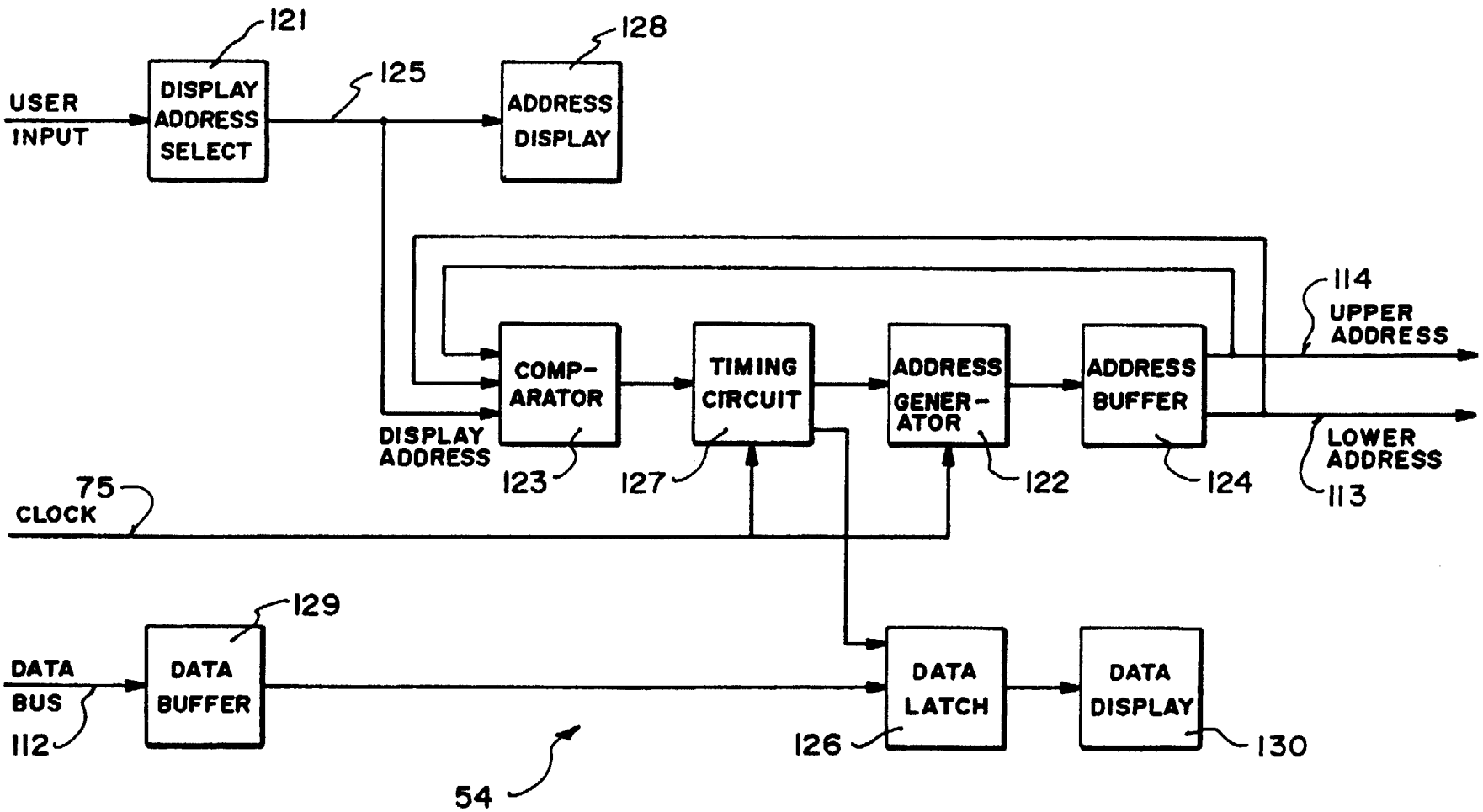
FIG. 6 is a block diagram of the circuitry employed in the monitor module.

Upon a memory read operation as described above, the process of storing the distance counter 94, 96 values is disabled. However, the scanner operation and distance counter 94, 96 control still occurs. When the memory read operation is finished, the normal scanning and storage operation resumes. Reading of the memory device 102 is generally performed by the monitor module 54 shown in FIG. 6.

The monitor module 54 includes a display address selector 121, which is set by the user. The user decides which image sensor 26, 30 and which zone he wishes to view. This information is entered into the display address selector 121 by thumb wheel switches or other such means. The display address selector 121 forms an eleven bit display address 125 representing the user input data.

This eleven bit display address 125 appears on an address display 128 which in this embodiment is a three digit, seven segment LED display. The eleven bit display address 125 is also supplied to the input of a comparator 123.

The monitor module 54 also includes an address generator circuit 122. The address generator 122 contains a twelve bit counter from which eleven bit addresses are derived. The twelve bit counter is incremented by the clock signal 75 to rapidly sequence through all combinations of twelve bit addresses. The output of the address generator 122 appears as eleven bits of binary data which are passed to the upper and lower address buses 114, 113 by an address buffer 124.

The address bus signals are also applied to the above comparator 123. The comparator 123 uses the display address 125 as a reference address and compares the upper and lower address bus 114, 113 values for a match. Upon a matched address, (i.e. when the address bus values match the desired display address value), the comparator 123 sends a signal to a timing circuit 127. The timing circuit 127 stops the address generator 122 at the current value and hence holds the current value on the upper and lower address buses 114, 113 for a pre-determined time, this time being dependent upon the access time of the memory device 102 in the data processing module 56.

The timing circuit 127 also supplies a sample and hold signal to a data latch circuit 126. While the above address bus value is being held and hence the memory device 102 being accessed, the sample and hold signal keeps the data latch 126 in the sample mode. In this mode, the data latch 126 receives data from the data bus 112 through a data buffer 129. Upon expiration of the pre-determined time described above, the timing circuit 127 causes the sample and hold signal to switch, thereby causing the data latch 126 to hold the input data. The data held is presented to a data display circuit 130. The data display circuit 130 in this case is a three digit seven segment LED display. Thus the contents of the memory device 102 are displayed on the data display 130 of the monitor module 54. The address generator 122 then resumes sequencing through all combinations of twelve bit address. Data is held on the display until the next time the address generator 122 presents the desired display address and the display is updated.

In summary, referring to FIG. 3, the scanning process begins at the system controller module 52. Upon receipt of a sync signal 77, the zoning circuit 78 of FIG. 4 presents zone addresses 82 to the memory device 102 in the data processing module 56, shown in FIG. 5, by way of the bus system 51. At the same time, the distance counters 94, 96 in the data processing module 56 are reset and started. At the same time, scanning of both of the image sensors 26, 30 at the scanner head module 58 of FIG. 3 is started.

As the scanning process proceeds, binary zeros from each image sensor 26, 30 located in the scanner head module 58 are transmitted to respective video detect circuits 90, 92 in the data processing module 56 shown in FIG. 5. As binary "0's" are received at each respective video detect circuit 90, 92 count pulses at the clock frequency of clock signal 75 are transmitted to the first and second distance counters 94, 96 respectively. Upon detection of light on a particular cell, the image sensor receiving that light will send a binary "1".

Assuming the first image sensor 26 receives the light beam, three successive binary "1's" will be sent to the first video detect circuit 90. Upon receipt of the first "1", the first video detect circuit 90 will cause the first distance counter 94 to receive count pulses at one-half of the clock frequency of clock signal 75. After the third of the three successive binary "1's" is detected, the first video detect circuit 90 will cease its output of count pulses. The first distance counter 94 will then stop counting and present its count value to the first input buffer 98.

A short time later assume, for example, that the second image sensor 30 at the scanner head module 58 of FIG. 3 receives light on three consecutive cells thereby transmitting three consecutive "1's" to the second video detect circuit 92 of FIG. 5 in the data processing module 56. In the same manner described above, the second video detect circuit 92 then causes the second distance counter 96 to stop counting and present its output to the second input buffer 100.

Upon completion of the scan of the first zone, the first latch signal 83.2 will cause the first input buffer 98 to present the contents of the first distance counter 94 to the memory device 102. The active first latch signal 83.2 will cause a first memory write operation to occur. This write operation will store a 16 bit value representing the first distance counter 94 contents and image sensor 26 information.

After the data from the first distance counter 94 is stored, the first latch signal 83.2 will go inactive and the second latch signal 83.4 will go active thereby enabling the second input buffer 100 presenting the contents of the second distance counter 96 to the memory device 102. The active second latch signal 83.4 being connected to one address line of the memory device 102 causes the memory address to increment. At the same time, the active second latch signal 83.4 causes a second memory write operation to occur. This second memory write operation will store a sixteen bit value representing the second distance counter 96 contents and image sensor 30 information. Thus the data from the first zone of each image sensor 26, 30 of FIG. 3 is stored in memory device 102 of FIG. 5. In a similar fashion, the data from the second, third, fourth, fifth and sixth zones of each image sensor 26, 30 are stored in the memory device 102. Upon completion of the scanning and storage process for all six zones of each image sensor 26, 30, the entire sequence is started again.

At any time during the scanning and storage process, the user may select particular image sensor 26, 30 and zone data he wishes to view. This is done by entering a sensor and zone selection on the display address selector 121 on the monitor module 54 shown in FIG. 6. When the user has made his selection, the appropriate address will appear on the address display 128. The address generator 122, then sequences through all possible eleven bit addresses. When the current address from the address generator 122 matches the display address 125, the timing circuit 127 is started this causes the current address from the address generator 122 to be held on the upper and lower address buses 114, 113 and causes the data latch 126 to go into the sample mode.

While the addresses are being held on the upper and lower address buses 114, 113, the address decoder 106 will of the data processing module 56 causes the lower address signals 113 to appear at the memory device 102 of FIG. 5. At the same time, the zone address buffer 108 is disabled. Also at the same time, the memory device 102 receives a chip enable 103 and output enable 105 thereby presenting its contents through the output buffer 110 to the data bus 112. Data appearing on the data bus 112 passes through the data buffer 129 in the monitor module 54 of FIG. 6 to the data latch 126. The data latch 126 receives the data and presents it to the data display 130. Upon the expiration of a pre-determined time, the data latch 126 holds the data and hence the display data is held. After the data latch 126 is in the hold mode, the address generator 122 is restarted and the display sequence begins again.

The circuit described above is by way of preferred example only. Other circuits could be devised to accomplish the same purposes.

The above embodiments relate to a main beam of light split into fractional beams extending along a plane. Alternatively, the main beam could be split into more fractional beams to produce a grid-like pattern of spots of light on the object. In this case the photodetector is two-dimensional rather than linear.

What is claimed is:

1. An optical apparatus, comprising:

light projecting means for projecting a main beam of light of relatively small diameter along an axis;

beam splitting means positioned along the axis for splitting the beam into a plurality of discrete fractional beams of light;

means for angularly displacing the fractional beams relative to each other so the beams extend along a common plane towards a position for an object; and photodetector array means having a plurality of pre-defined zones positioned to receive respective individual fractional beams after the fractional beams are reflected off the object.

2. An apparatus as claimed in claim 1 wherein said plurality of zones are adjacent each other.

3. An apparatus as claimed in claim 1 wherein said zones are arranged in a row on said sensor.

4. An apparatus as claimed in claim 1 wherein said zones are arranged contiguously on said sensor.

5. An apparatus for monitoring and determining the distances of points on a surface of a strip of material from a pre-determined reference axis, comprising:

means for projecting a stationary light beam of small diameter along an optical axis towards the surface;

means along the axis for dividing the stationary beam into a plurality of angularly spaced apart smaller beams directed towards the surface and extending along a common plane intersecting with the surface to produce a plurality of linearly spaced apart spots of light on the surface;

first means for gathering reflected light from the points on the surface and projecting real images of the spots onto a straight line along a first photodetector plane; and first linear photodetector means having a plurality of pre-defined zones positioned along the line extending along the first photodetector plane to receive respective individual images of the spots, the first linear photodetector means providing a quantified signal output representing the positions of the images in respective zones along the line representing the positions on the strip surface where the spots of light occur relative to the reference axis.

6. An apparatus as claimed in claim 5, further comprising means for scanning the zones of the image sensor sequentially to detect the positions of the real images of the spots of light within each of the zones.

7. An apparatus as claimed in claim 6 wherein the zones have a plurality of cells and the means for scanning the zones of the image sensor comprises an electronic circuit for scanning the pixels in each zone until a center cell corresponding to the center of the real image of the spot within the zone is located.

8. An apparatus for monitoring and determining the distances of points on a surface of a strip of material from a predetermined reference axis, comprising:

means for projecting a stationary light beam of small diameter along an optical axis towards the surface;

means along the axis for dividing the stationary beam into a plurality of angularly spaced-apart smaller beams directed towards the surface and extending along a common plane intersecting with the surface to produce a plurality of linearly spaced apart spots of light on the surface;

first means for gathering reflected light from the points on the surface and projecting real images of the spots onto a straight line along a first photodetector plane;

first linear photodetector means for determining the positions of the real images of the spots along the line extending along the first photodetector plane, the first linear photodetector means including a linear charge coupled image sensor having a plurality of adjacent ones, each said zone being positioned to receive the real image of one of the spots of light, the first linear photodetector means providing a quantified signal output representing the positions of the images along the line representing the positions on the strip surface where the spots of light occur relative to the reference axis.

9. An apparatus as claimed in claim 8, wherein the means for projecting is a laser.

10. An apparatus as claimed in claim 8, wherein the means for dividing is a fibre grating.

11. An apparatus as claimed in claim 8, wherein the means for dividing is a diffraction grating.

12. An apparatus as claimed in claim 8, wherein the means for gathering is a converging lens system.

13. An apparatus as claimed in claim 8, further comprising second means for gathering reflected light from the spots on the surface and projecting real images of the spots onto a straight line along a second photodetector plane; and second linear photodetector means for determining the positions of the real images of the spots along the line extending along the second photodetector plane, the second linear photodetector means providing a quantified signal output representing the positions of the images along the second line representing the positions of the strip surface where the spots of light occur relative to the reference axis;

the first means for gathering and the first linear photodetector means being positioned to gather and detect smaller beams reflected to a first side of the stationary light beam and the second linear photodetector being positioned to gather and detect smaller beams reflected to a second side of the stationary light beam.

14. An apparatus as claimed in claim 8, further comprising means for scanning the zones of the image sensor sequentially to detect the positions of the real images of the spots of light within each of the zones.

15. An apparatus as claimed in claim 14, wherein the means for scanning the zones of the image sensor comprises an electronic circuit.

16. An optical apparatus comprising:

light projecting means for projecting a main beam of light of relatively small diameter along an axis;

beam splitting means positioned along the axis for splitting the beam into a plurality of discrete fractional beams of light;

means for angularly displacing the fractional beams relative to each other so the beams extend along a common plane towards a position for an object;

photodetector array means positioned to receive the fractional beams after the fractional beams are reflected off the object, the photodetector array means having a plurality of adjacent zones;

light gathering means for gathering the fractional beams of light reflected off the object and for projecting the real image of each fractional beam onto a different said zone; and means for scanning each of the zones sequentially to determine the positions of each of the real images within each of the zones.

17. An apparatus as claimed in claim 16, wherein the beam splitting means is a fibre grating.

18. An apparatus as claimed in claim 16, wherein the beam splitting means is a diffraction grating.

19. An apparatus as claimed in claim 16, wherein the light gathering means is a lens system.

20. An apparatus as claimed in claim 16, wherein the photodetector array means comprises a linear charge coupled image sensor.

*21. An apparatus for monitoring and determining the distances of points on a surface of a strip of material from a pre-determined reference axis, comprising:*

*means for projecting a plurality of angularly spaced apart beams of light directed towards the surface and extending along a common plane intersecting with the surface to produce a plurality of linearly spaced apart spots of light on the surface;*

*first means for gathering reflected light from the points on the surface and projecting real images of the spots onto a straight line along a first photodetector plane; and*

*first linear photodetector means having a plurality of pre-defined zones positioned along the line extending along the first photodetector plane to receive respective individual images of the spots, the zones being positioned and dimensioned so that each said image impinges upon a different said zone, whereby the point on the surface corresponding to each beam of light can be determined from the zone upon which each said image impinges, the first linear photodetector means providing a quantified signal output representing the position of each said image in its respective zone along the line representing the position on the strip surface where each said spot of light occurs relative to the reference axis.*

* * * * *